June 1, 1954 — W. E. METZLER — 2,679,679
CUTOFF TOOL
Filed Nov. 23, 1951
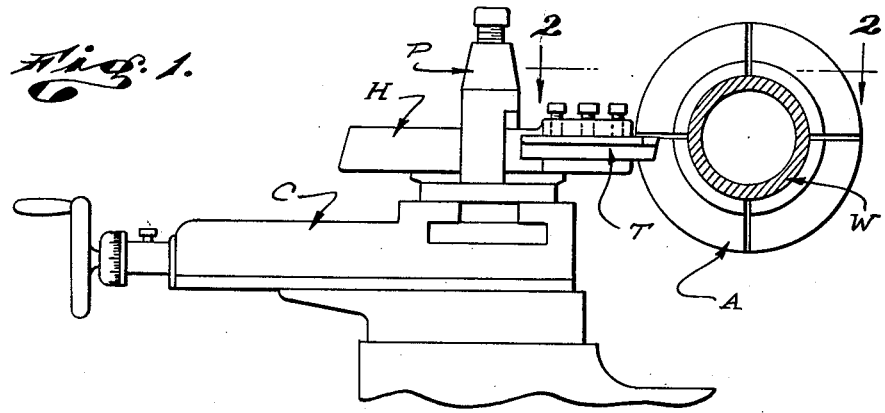
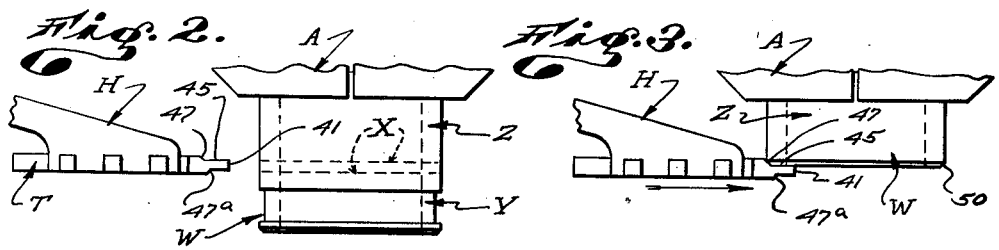
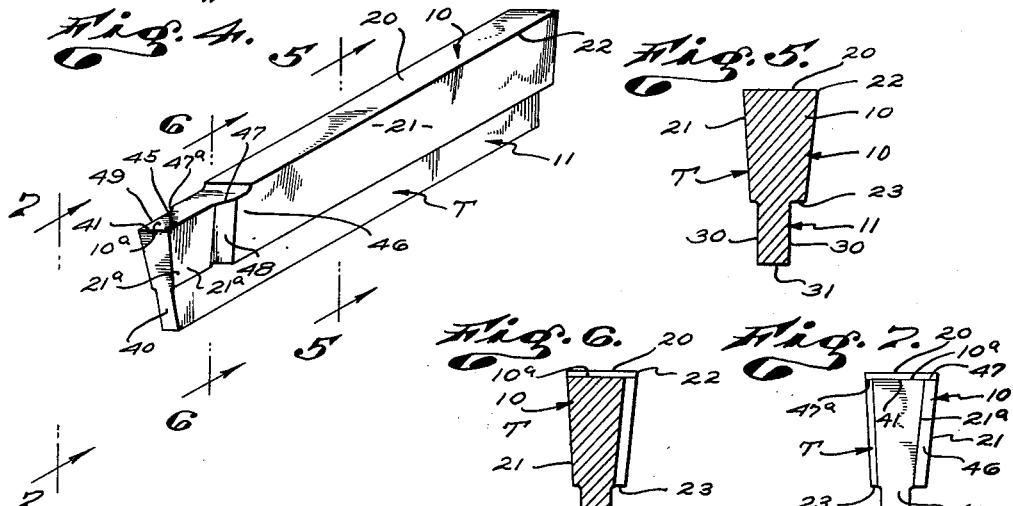
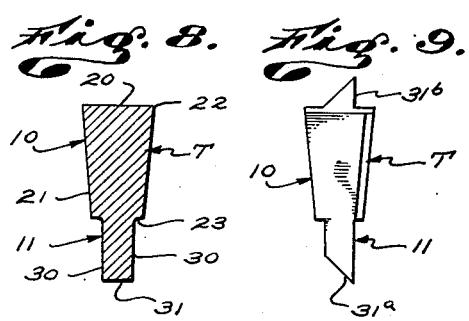
INVENTOR.
Wilbur E. Metzler
BY
Attorney Patented June 1, 1954

2,679,679

UNITED STATES PATENT OFFICE 2,679,679

CUTOFF TOOL

Wilbur E. Metzler, Los Angeles, Calif.

Application November 23, 1951, Serial No. 257,803

10 Claims. (Cl. 29—95)

This invention relates to a cut-off tool, that is, to a tool for use in a lathe, or like machine, to perform a cut-off operation, and it is a general object of the invention to provide a tool of this character, practical and effective, for performing a cut-off operation and serving to follow that operation with a forming, finishing, trimming or dressing operation.

In lathes and machines of that character, particularly in automatic machines, it is frequently necessary to perform what is known as a "cut-off" operation, and in many machining operations it is desired to follow a cut-off operation by another or different cut or operation. With the usual cut-off tool the work left in the machine is left with a sharp edge, or possibly a burr, and the succeeding tool may not feed onto or over the work in the desired manner. In many cases it is necessary to resort to expensive construction in the tools or mechanisms that follow cut-off operations in order to gain the desired feed or to avoid the difficulty presented by the sharp, burred or untrimmed corner left by the cut-off.

It is a general object of this invention to provide a cut-off tool particularly useful in an automatic machine where the cut-off operation is to be followed by one or more other or succeeding operations, and which tool is such as to serve in an efficient and practical manner in making the desired cut and is such as to follow the cut-off operation with a trimming or dressing operation, leaving the work in the machine in a form ready to receive other tools or equipment, such as a box mill or the like.

Another object of this invention is to provide a tool of the general character referred to which is of such general form or cross-sectional configuration as to be readily dressed to provide the desired cutting edges or parts, while at the same time being strong and rigid.

A further object of the invention is to provide a tool of the general character referred to which is of such form as to be readily dressed to provide effective cutting edges serving to perform the desired cut-off operation as well as the trimming or dressing of the work left in the machine following the cut-off.

The tool of the present invention is particularly practical in automatic machines where turning operations are performed and the tool is especially formed for the purpose of carrying out a cut-off operation. To facilitate an understanding of the tool, it may be considered as acting upon work carried in a rotating chuck, or the like, and the tool may be carried in a tool holder supported by a carriage, fed or operated in any suitable manner. In an automatic machine where the tool is used the carriage will, of course, be fed or operated automatically. However, for the purpose of understanding the operation of the tool, it may be considered as supported in a typical tool holder in turn carried by a usual or common lathe carriage. The tool of the present invention is an elongate unitary element, substantially T-shaped in cross-sectional configuration so that it has a head and a depending stem or rib. The leading or forward end of the tool is dressed to establish a main cutting edge across the head of the tool at the top thereof. One or both of the sides of the head are dressed to establish side edges extending lengthwise of the tool and proceeding rearward from the main cutting edge.

At one side of the head, that is, at the side of the head which is to oppose the work part left in the machine following the cut-off operation, the head is dressed away a substantial amount and is dressed away for a predetermined distance from the main edge to establish a forwardly faced shoulder portion which is dressed to provide a trimming edge that serves to act after the cut-off has been completed and to dress or trim the outer corner of the work part left in the machine. If desired, both sides of the head can be dressed in the manner just described. The top of the head is preferebly dressed down from time to time to keep the several cutting edges sharp.

The various objects and features of my invention will be fully understood from the following detailed description of typical preferred forms and applications of the invention, throughout which description reference is made to the accompanying drawings, in which:

Fig. 1 is a view illustrating a tool embodying the invention and held by a tool holder supported by the carriage of a machine, the tool being shown related to work located in a chuck of the machine. Fig. 2 is an enlarged plan view of a portion of the structure shown in Fig. 1, being a view taken as indicated by line 2—2 on Fig. 1. Fig. 3 is a view similar to Fig. 2, showing the tool after the cut has been completed and in position to effect trimming or dressing of the work part left in the chuck following the cut-off. Fig. 4 is a perspective view of the tool provided by the invention, showing the forward or leading end of the tool and the side thereof which opposes the work part left in the machine following the cut-off. Fig. 5 is a transverse sectional view of the tool, being a view taken substantially as indicated by line 5—5 on Fig. 4. Fig. 6 is a transverse sectional view, taken substantially as indicated by line 6—6 on Fig. 4. Fig. 7 is an end view, taken substantially as indicated by line 7—7 on Fig. 4. Fig. 8 is a sectional view similar to Fig. 5, showing a tool of cross-section somewhat different from that illustrated in Fig. 5, and Fig. 9 is a view similar to Fig. 7, showing a modified form of tool.

The tool T provided by this invention is useful, generally, in carrying out what is known as a cut-off operation, and it is particularly practical for use in an automatic machine where such an operation is to be performed. Since such a machine as a whole is no part of the invention, I have elected to illustrate the tool T in use in a rather simple or elemental way, that is, as being carried by a conventional holder H supported by the post P of a carriage C, and the tool is shown to act upon work W in a chuck A which may be considered as carried by a rotating spindle. Referring to Fig. 2, the tool T is set to perform a cut-off operation on the work W, as indicated by the lines X. When this cut-off operation is completed, the work W is left with a severed section Y and a remaining section or portion Z in the chuck A.

The tool T of the present invention is best illustrated in Fig. 4 of the drawings where it will be observed that the tool is an elongate unitary element, T-shaped in cross-sectional configuration, so that it has, in effect, a head portion 10 and a depending stem or rib portion 11. In accordance with the invention, the tool is initially formed so that it is substantially of uniform cross-section from one end to the other, and following its initial formation it is dressed to give its forward end portion the desired contour or shape, as will be hereinafter described.

The tool may, in practice, be varied considerably in size, shape or proportioning, depending upon the work or service to be performed. In a typical case, such as is illustrated in the drawings, the head 10 is formed to have a flat top 20, flat sides 21 depending from the edges 22 of the top, and a flat bottom 23 parallel with the top 20. It is preferred in practice that the sides 21, though flat, are not parallel, but rather are pitched downward and somewhat inward to be slightly convergent, as shown in the drawings, and particularly in Fig. 5 of the drawings.

The rib portion 11 of the tool depends from the bottom 23 of the head 10, and in practice is formed so that it is of such thickness and vertical extent as to give the tool the desired strength and rigidity. It is to be observed that the rib 11 is integrally joined to and is in effect an extension of the head 10, and in the case illustrated the rib is shown as having flat sides 30 and a flat bottom 31. The sides 30 of the rib are shown as parallel and the bottom 31 is flat and horizontally disposed to rest upon the seat of the usual tool holder. The rib 11 is narrower than the head 10 and is spaced inwardly from the sides 21 of the head so that it extends downward from the head at a point intermediate the sides thereof.

In the form of the invention shown in Figs. 1 to 8, inclusive, the rib is shown located somewhat closer to one side of the head than the other, and when this relationship is provided it is preferred that the side of the head projecting fartherest from the rib 11 be employed or disposed to oppose the end of the work part Z left in the chuck when the cut-off operation has been completed.

In accordance with the invention, the forward end 40 of the tool is dressed or beveled away establishing a main transverse cutting edge 41 in the leading end of the tool where the end 40 joins or intersects the top of the body of the tool. The main cutting edge 41 is the part or edge of the tool that performs the main cut as the tool is advanced from the position shown in Fig. 1 to that shown in Fig. 3, during the course of which operation the cut-off operation is performed, severing the work parts Y and Z.

The side of the head 10 that opposes the work part Z is dressed away at the forward or leading edge portion of the tool establishing a side edge 45 extending longitudinally of the tool and proceeding rearwardly from the main edge 41. The side dressing just referred to is preferably of substantial depth or extent with the result that the forward end portion of the tool is provided or formed wih a shoulder portion 46 having a trimming edge 47 continuing from the point where the side edge 45 terminates. The trimming edge 47 may, in practice, be formed to trim or form the corner 50 of the work part Z in any desired manner, for instance, it may be formed to round the corner 50, or to bevel it or to shape it, as circumstances may require. It is preferred in practice that the shoulder portion 46 be beveled or dressed away at 48 to extend downward and recede somewhat from the trimming edge 47 to provide the desired clearance beneath the edge 47. Further, it is to be noted that the trimming or dressing of the side of the head at the forward end portion to provide the side edge 45 is such as to leave the side portion 21ᵃ depending from edge 45 shaped so that it recedes somewhat from the edge 45 providing clearance relative thereto.

If desired, the side of the head opposite the one just referred to, that is, the side which opposes the work part Z which is severed, may be especially dressed or fashioned, as circumstances require. As shown in the drawings, the side opposing work part Y is dressed or cut away establishing a shoulder with an edge 47ᵃ acting on part Y to trim or form its corner before that part is separated from part Z. The edge 47ᵃ is forward of edge 47.

In accordance with the present invention, the top of the head 10, at the forward portion of the tool is dressed or cut down from time to time, mainly to maintain the several cutting edges sharp without materially changing their relationship. In the form of the invention illustrated in the drawings, the top portion 10ᵃ of the head occurring at the forward portion of the tool, where the main edge 41, side edge 45, and trimming edge 47 occur, is flat and dressed or finished so that it extends horizontally between the side edges 45 and 49.

The tool of the present invention formed as hereinabove described can be readily set in a conventional holder H, and being T-shaped in cross-sectional configuration it has substantial strength and rigidity. With the tool formed, and as clearly illustrated in Fig. 4, it is highly efficient and practical as a cut-off tool, that is, for performing a severing operation that serves to part the portions Y and Z of the work W. In the course of this operation, the main edge 41 is the principal cutting part thereof, and one or both of the side edges at the head or forward portion of the tool may dress or trim the work.

When the cut-off has been completed, the tool is further advanced to bring the trimming edge 41 into engagement with the corner 50 of the work part Z with the result that the corner 50 is trimmed in the desired manner. This trimming may be such as to merely remove any burrs or ragged parts left as a result of the cut-off, or it may be such as to perform a substantial cut, that is, it may round, bevel, or otherwise shape or form the corner 50 to a substantial degree, as circumstances require. When the trimming operation has been completed, the tool can be withdrawn and the work part Z left in the machine ready to receive additional tools or equipment and is left in a condition or form for the reception of such tools or equipment.

By forming the tool with a head 10 of substantial extent, vertically, dressing or sharpening operations can be performed by dressing the tool away at the top of the head to maintain the tool with the edges in the desired sharpened condition, and such sharpening operations can be repeated on numerous occasions without materially weakening the tool and without materially distorting the shape of the tool from that which was originally established.

In the form shown in Fig. 9, the bottom 31ᵃ of the rib is beveled or pitched and the top of the head is provided with a beveled ridge 31ᵇ. These features facilitate mounting the tool in a holder of the type wherein the tool is held by a wedging action and requires the tool to have beveled parts, such as I have shown.

Having described only typical preferred forms and applications of my invention, I do not wish to be limited or restricted to the specific details herein set forth, but wish to reserve to myself any variations or modifications that may appear to those skilled in the art and fall within the scope of the followings claims.

Having described my invention, I claim:

1. A cutting tool of the character described, including an elongate unit having a head extending longitudinally of the unit and a rib narrower than the head and extending longitudinally of the unit and depending from the bottom of the head, the unit having its forward end dressed establishing a main cutting edge extending transversely of the head at the top thereof, and the head having a side portion projecting laterally relative to the rib and recessed at the forward portion of the unit establishing a side cutting edge extending rearwardly from the main cutting edge and establishing a shoulder with a forwardly facing trimming edge at the top thereof and extending from where the side edge terminates.

2. A cutting tool of the character described, including an elongate unit having a head extending longitudinally of the unit and a rib extending longitudinally of the unit and depending from the bottom of the head, the head being wider than the rib establishing side portions of the head projecting in opposite directions from the rib laterally of the tool, the unit having its forward end dressed establishing a main cutting edge extending transversely of the head at the top thereof, and the head having one side portion recessed at the formed portion of the unit establishing a side cutting edge extending rearwardly from the main cutting edge and establishing a shoulder with a trimming edge at the top thereof and extending from where the side edge terminates.

3. A cutting tool of the character described, including an elongate unit having a head extending longitudinally of the unit and a rib extending longitudinally of the unit and depending from the bottom of the head, the head being wider than the rib establishing side portions of unequal width projecting in opposite directions from the rib laterally of the tool, the unit having its forward end dressed establishing a main cutting edge extending transversely of the head at the top thereof, and the head having the widest side portion recessed at the forward portion of the unit establishing a side cutting edge extending rearwardly from the main cutting edge and establishing a forwardly facing shoulder with a trimming edge at the top thereof and projecting from where the side edge terminates.

4. A cutting tool of the character described, including an elongate unit having a head extending longitudinally of the unit and a rib extending longitudinally of the unit and depending from the bottom of the head, the head being wider than the rib establishing side portions of equal width projecting laterally of the tool in opposite directions from the rib, the unit having its forward end dressed establishing a main cutting edge extending transversely of the head at the top thereof, and the head having one side portion recessed at the formed portion of the unit establishing a side cutting edge extending rearwardly from the main cutting edge and establishing a shoulder with a trimming edge at the top thereof and extending from where the side edge terminates.

5. A cutting tool of the character described, including an elongate unit having a head extending longitudinally of the unit and a rib extending longitudinally of the unit and depending from the bottom of the head, the unit having its forward end dressed establishing a main cutting edge extending transversely of the head at the top thereof, and the head having a side portion projecting laterally relative to the rib and recessed at the formed portion of the unit establishing a side cutting edge extending rearwardly from the main cutting edge and establishing a shoulder with a trimming edge at the top thereof and extending from where the side edge terminates, the top of the head being dressed where the said edges occur.

6. A cutting tool of the character described, including an elongate unit having a head extending longitudinally of the unit and a rib extending longitudinally of the unit and depending from the bottom of the head, the unit having its forward end dressed establishing a main cutting edge extending transversely of the head at the top thereof, and the head having side portions projecting laterally relative to the rib and recessed at the formed portion of the unit establishing side cutting edges extending rearwardly from the main cutting edge and establishing shoulders with forwardly facing trimming edges at the top thereof and extending from where the side edges terminate, the top of the head being dressed down where the said edges occur.

7. A cutting tool of the character described, including an elongate unit having a head extending longitudinally of the unit and a rib extending longitudinally of the unit and depending from the bottom of the head, the unit having its forward end dressed establishing a main cutting edge extending transversely of the head at the top thereof, and the head having a side portion projecting laterally relative to the rib and recessed at the formed portion of the unit establishing a side cutting edge extending rearwardly from the main cutting edge and establishing a shoulder with a trimming edge at the top thereof where the side edge terminates, the side of the head adjacent the side cutting edge being pitched to extend downward and somewhat inward.

8. A cutting tool of the character described, including an elongate unit having a head extending longitudinally of the unit and a rib extending longitudinally of the unit and depending from the bottom of the head, the unit having its forward end dressed establishing a main cutting edge extending transversely of the head at the top thereof, and the head having a side portion projecting laterally relative to the rib and recessed at the formed portion of the unit establishing a side cutting edge extending rearwardly from the main cutting edge and establishing a shoulder with a trimming edge at the top thereof where the side edge terminates, the sides of the head being downwardly convergent.

9. A cutting tool of the character described, including an elongate unit having a head extending longitudinally of the unit and a rib narrower than the head and extending longitudinally of the unit and depending from the bottom of the head, the unit having its forward end dressed establishing a main cutting edge extending transversely of the head at the top thereof, and the head having a side portion projecting laterally relative to the rib and recessed at the forward portion of the unit establishing a side cutting edge extending rearwardly from the main cutting edge and establishing a shoulder with a forwardly facing trimming edge at the top thereof and extending from where the side edge terminates, the head having a flat top and the rib having a flat bottom parallel with the top of the head.

10. A cutting tool of the character described, including an elongate unit having a head extending longitudinally of the unit and a rib narrower than the head and extending longitudinally of the unit and depending from the bottom of the head, the unit having its forward end dressed establishing a main cutting edge extending transversely of the head at the top thereof, and the head having a side portion projecting laterally relative to the rib and recessed at the forward portion of the unit establishing a side cutting edge extending rearwardly from the main cutting edge and establishing a shoulder with a forwardly facing trimming edge at the top thereof and extending from where the side edge termintes, the bottom of the rib being inclined laterally of the tool to extend up from the side of the tool where the side cutting edge occurs and the top of the head having a longitudinal ridge thereon with a top inclined transversely of the tool to extend down from the side of the tool where the side cutting edge occurs.

References Cited in the file of this patent

UNITED STATES PATENTS

| Number | Name | Date |
| --- | --- | --- |
| 2,223,831 | Leurs | Dec. 3, 1940 |
| 2,596,110 | Adrien | May 13, 1952 |

OTHER REFERENCES

New Encyclopedia of Machine Shop Practice, published by William H. Wise and Co. Inc. 1941. Page 155.